United States Patent [19]

Ewen et al.

[11] Patent Number: 4,767,735

[45] Date of Patent: Aug. 30, 1988

[54] CATALYST PRETREATMENT PROCESS

[75] Inventors: John A. Ewen; Alan H. Bitzer, both of Houston, Tex.

[73] Assignee: Cosden Technology, Inc., Dallas, Tex.

[21] Appl. No.: 9,712

[22] Filed: Feb. 2, 1987

[51] Int. Cl.$^4$ .............................................. C08F 4/64
[52] U.S. Cl. ................................... 502/109; 502/108; 525/53; 526/90; 526/159
[58] Field of Search ............... 502/108, 109, 127, 125; 525/53; 526/90, 159, 128

[56] References Cited

U.S. PATENT DOCUMENTS

| | | | |
|---|---|---|---|
| 3,113,115 | 12/1963 | Ziegler et al. | 502/103 |
| 3,793,295 | 2/1974 | Luciani et al. | 502/125 X |
| 3,893,989 | 7/1975 | Leicht et al. | 260/93.7 |
| 4,107,413 | 8/1978 | Giannini et al. | 502/121 X |
| 4,187,196 | 2/1980 | Giannini et al. | 502/111 |
| 4,200,717 | 4/1980 | Abe et al. | 502/108 X |
| 4,226,741 | 10/1980 | Luciani et al. | 502/120 |
| 4,287,328 | 9/1981 | Kikuta et al. | 502/108 X |
| 4,294,721 | 10/1981 | Cecchin et al. | 502/127 X |
| 4,316,966 | 2/1982 | Mineshima et al. | 525/53 |
| 4,390,454 | 6/1983 | Cuffiani et al. | 502/154 |
| 4,439,540 | 3/1984 | Cecchin et al. | 502/127 X |
| 4,495,338 | 1/1985 | Mayr et al. | 502/104 X |
| 4,547,476 | 10/1985 | Terano et al. | 502/127 |

FOREIGN PATENT DOCUMENTS 1580635 12/1980 United Kingdom.

OTHER PUBLICATIONS

Szabo, *Contact Catalysis*, vol. 2, p. 342, (1976), Pub. By Elsevier Scientific Pub. Co., N.Y., N.Y.
"Polypropylene," Kirk-Othmer, Encyclopedia of Chemical Technology, Third Edition, John Wiley & Sons, 1981, vol. 16, pp. 453-469.

*Primary Examiner*—Patrick P. Garvin
*Attorney, Agent, or Firm*—William D. Jackson; John K. Abokhair; M. Norwood Cheairs

[57] ABSTRACT

A process for pretreating a Ziegler-type catalyst for use in olefin polymerization reactions. An olefin monomer is aded to a fluid carrier stream containing a Ziegler-type catalyst. The carrier stream containing the monomer and the catalyst is passed through an elongated tubular reactor at a flow rate sufficient to provide a residence time in the tubular reactor of less than 1 minute and under temperature conditions to prepolymerize the catalyst within the tubular reactor without plugging of the reactor. In a specific embodiment the residence time within the reactor is no more than 10 seconds, and more particularly, no more than 2 seconds.

16 Claims, 1 Drawing Sheet

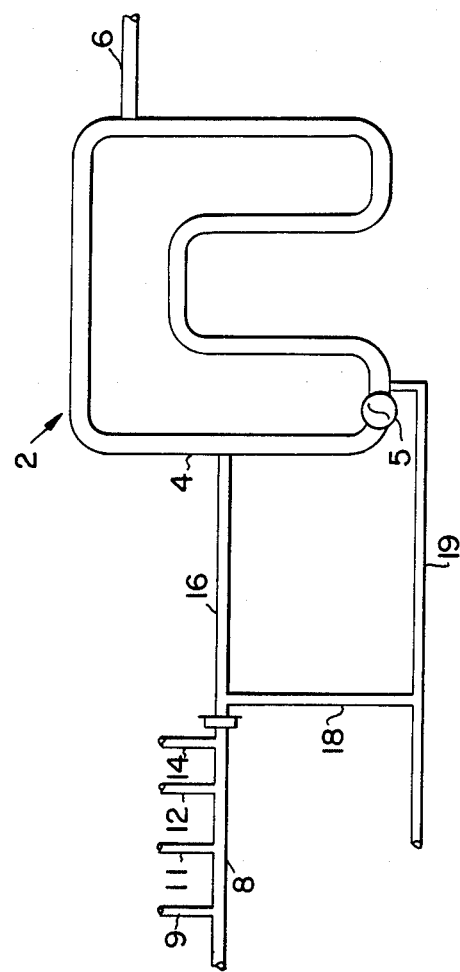

CATALYST PRETREATMENT PROCESS

TECHNICAL FIELD

This invention relates to the supply of pretreated Ziegler-type catalysts to olefin polymerization reactors and more particularly to methods of pretreating such catalysts under prepolymerization conditions over a relatively short and closely controlled residence time in an elongated tubular reactor prior to introduction of the catalyst into the main reactor system.

ART BACKGROUND

Since their first introduction over 30 years ago, Ziegler-type catalysts have been widely used in the chemical industry for the production of olefin polymers, principally the production of homopolymers and copolymers derived from ethylene or propylene.

The early Ziegler catalysts are described in U.S. Pat. No. 3,113,115 to Ziegler et al. They may be characterized basically as a chemical complex derived from a halide of a transition metal from Groups IV-VIII of the Periodic Table, for example, titanium, vanadium, chromium, and zirconium and a metal hydride or metal alkyl based upon a metal from Groups I-III, most notably aluminum based compounds such as trialkyl aluminum and dialkyl aluminum halides. Also employed in Ziegler catalyst systems, particularly where it is desirable to achieve a highly stereospecific isotactic polymer are Lewis bases, or electron donors, commonly referred to as ED compounds. Numerous ED compounds are known in the art and include ethers, esters, and polysilanes or siloxanes.

Examples of Ziegler catalyst systems which are known in the art and to which this invention pertains include those disclosed in U.S. Pat. Nos. 3,793,294 (Luciani et al); 4,107,413 (Giannini et al); 4,187,196 (Giannini et al); 4,226,741 (Luciani et al); 4,294,721 (Cecchin et al); 4,390,454 (Cuffiani et al); 4,439,540 (Cecchin et al); 4,495,338 (Mayr et al); and 4,547,476 (Terano et al).

It is conventional practice to prepolymerize a Ziegler-type catalyst prior to introducing the catalyst into the polymerization reaction zone. The prepolymerization typically takes place in an initial, relatively small reactor prior to introduction of the catalyst into the main polymerization reactor. For example, U.S. Pat. No. 4,316,966 to Mineshima et al discloses a process in which a Ziegler-type catalyst is prepolymerized in an initial separate reaction zone with ethylene, propylene or another alpha-olefin depending upon the desired polymer product. The product contained in the prepolymerization step is recovered from the initial reaction zone and used in subsequent reaction zones. Other procedures for pretreating Ziegler-type catalysts under prepolymerization conditions are disclosed in U.S. Pat. Nos. 3,893,989 (Leicht et al), 4,200,717 (Abe et al) and 4,287,328 (Kikuta et al) and in British Patent Specification No. 1,580,635 (Mitsui).

The prepolymerization step conducted in accordance with the prior art teachings proceeds at a slow pace. A common expedient is to prepolymerize the catalyst in a batch-type operation in which the reaction zone is charged with the components of the catalyst system and the propylene or other olefin monomer then added over a number of hours while the mixture is agitated. An alternative procedure as disclosed in the aforementioned patent to Mineshima et al is to carry out the prepolymerization reaction continuously and couple it with the subsequent polymerization steps. Here, the residence time of the catalyst system in the prepolymerization reactor, while sometimes shorter than as in the case of the batch-type operation, is still a relatively long one.

DISCLOSURE OF THE INVENTION

In accordance with the present invention there is provided a new and improved process for the supply of a prepolymerized Ziegler-type catalyst system to an olefin polymerization reactor. The invention provides for a residence time in the prepolymerization reactor which is much shorter than that encountered in prior art procedures. In carrying out the invention, a fluid carrier stream containing a Ziegler-type catalyst system is established. Thereafter olefin monomer is added to the carrier stream and the stream containing the catalyst system and the monomer is flowed through an elongated tubular reactor. The stream is passed through the tubular reactor at a flow rate sufficient to provide a residence time in the reactor of less than one minute. The tubular reactor is operated at temperature conditions sufficient to precoat the catalyst by polymerization of the monomer without such polymerization as would, given the residence time within the reactor, plug the reactor. The output from the tubular prepolymerization reactor is then applied to the main polymerization reactor.

A preferred application of the invention is in the prepolymerization of the catalyst with propylene monomer in connection with the manufacture of polypropylene, either as a homopolymer or as a copolymer such as propylene copolymerized with ethylene. Preferably, the residence time of the carrier fluid within the tubular reactor after addition of the propylene monomer is no more than 10 seconds. The tubular reactor is operated at a temperature of about 30° C. or less. In yet a further embodiment of the invention, the tubular reactor has an internal diameter of 1 cm or less and the residence time within the reactor subsequent to the addition of propylene monomer is no more than 2 seconds.

BRIEF SUMMARY OF THE DRAWING

The Drawing is a schematic illustration of the invention as used in supplying a prepolymerized catalyst system to a continuous flow reactor used for the polymerization of propylene in the liquid phase.

BEST MODES FOR CARRYING OUT THE INVENTION

As noted previously, the precoating or prepolymerization of an olefin polymerization catalyst is an important step in the polymer production process. The precoating step preserves the morphology of the catalyst as it is supplied to the polymerization reactor. Disintegration of the catalyst, which might otherwise occur, is retarded, thereby decreasing the bulk density of the polymer product within the main reactor and reducing the amount of polymer fines. This is of a particular concern in the case of highly active or fragile catalysts which are subject to disintegration. Prepolymerization of the catalyst also increases catalyst activity and provides for better isotactic control of the polymer product and results in a product of increased bulk density.

As disclosed in the aforementioned prior art patents, Ziegler-type catalyst systems typically involve the basic Ziegler catalyst component, a cocatalyst, and an electron donor or ED compound, and the invention will be described in reference to such catalyst systems. Ziegler catalyst systems as used in the polymerization of polypropylene are described in Kirk-Othmer, Encyclopedia of Chemical Technology, Third Edition, John Wiley & Sons 1981, Vol. 16, pp. 453-469 in the section entitled "Polypropylene" which is incorporated herein by reference. For a further description of such catalysts and the prepolymerization thereof, the entire disclosures of the aforementioned U.S. Pat. Nos. 3,893,989, 4,200,717, 4,287,328, and 4,316,966 and British Patent Specification No. 1,580,635 are incorporated herein by reference.

As disclosed, for example, in the aforementioned Kirk-Othmer article, the base catalyst component is typically a titanium chloride, preferably a titanium tetrachloride, although in some cases a titanium trichloride or a titanium dialkylchloride may be employed. The titanium chloride is normally supported on magnesium chloride, magnesium hydroxide, organo magnesium compounds, alumina or silica. The most commonly employed catalyst support is magnesium dichloride. The second Ziegler catalyst component is a cocatalyst normally based upon aluminum, as described previously. The most commonly used cocatalyst is an organoalumium compound such as a trialkylaluminum, a trialkyloxyaluminum or an alkylaluminum dihalide or a dialkylaluminum halide in which the halogen component is provided by chlorine, bromine or iodine. A preferred cocatalyst for the production of polypropylene of high isotactic index is triethylaluminum, commonly referred to as "TEAL".

The Lewis base or electron donor (ED) compound is employed to increase the stereospecificity of the catalyst and in some cases results in an increase in catalyst activity. Examples of useful electron donors include amines, amides, ethers, ketones, nitriles, phosphines, stibines, arsines, phosphoramides, thioethers, thioesters, aldehydes, alcoholates, amides and salts of organic acids. Some examples of preferred electron donors which are effective stereoregulators or stereospecifiers include the esters of carboxylic, alkoxy or amino acids, and the esters of aromatic acids. Preferred electron donors are organic silicon compounds, for example, diphenyl dimethoxy silane (DPMS). DPMS acts to facilitate the production of stereoregular highly isotactic polypropylene.

Applicants have found that through the use of a relatively short, small-gauge tubular reactor, catalyst systems of the type commonly employed in propylene production which typically are prepolymerized under prolonged conditions, can be almost instantly prepolymerized to provide a polymer yield equal to or greater than that achieved when the catalyst is prepolymerized under the conventional prolonged conditions.

The drawing is a schematic illustration showing the prepolymerization system of the present invention set up for the supply of prepolymerized catalyst to a continuous flow-type polypropylene reactor. The continuous flow reactor 2 normally will take the form of a loop 4 equipped with an impeller 5. As will be understood by those skilled in the art the impeller 5 functions to circulate the polymerization reaction mass continuously through the loop at controlled temperature and pressure conditions. The polymer product is withdrawn from the reactor via line 6.

The operation of the invention will be described with reference to a specific titanium chloride, TEAL, DPMS system for the purpose of simplicity. However, those skilled in the art will recognize that the following description is also applicable to other Ziegler-type catalyst systems.

A carrier stream for the prepolymerization reactor is initially established by the supply of a suitable solvent for the organic catalyst components to a mixing line 8. The organic solvent, such as hexane or heptane, is supplied to the mixing line via line 9. TEAL and DPMS are supplied to the carrier fluid from suitable sources (not shown) via lines 11 and 12, respectively. After addition of the cocatalyst and electron donor, the titanium chloride base component is supplied to the carrier fluid via line 14. The catalyst may be supplied by any suitable procedure, either continuously or intermittently. The carrier fluid containing the catalyst components is then supplied to a tubular reactor 16 where it is mixed with liquid propylene supplied, for example, by a secondary line 18 leading from a main propylene supply line 19. The amount of propylene supplied to the prepolymerization reactor 16 is relatively small in comparison to the amount of propylene supplied via the main supply line 19 to the polymerization reactor 2. The propylene supplied to the prepolymerization reactor 16 and also the main reactor 2 normally will have small amounts of hydrogen entrained therein.

As noted previously, because of the perceived slow reaction time of the prepolymerization reaction, the residence times of the propylene and catalyst components in prior art prepolymerization reactors are normally on the order of minutes or even hours. Also the capacity of the prepolymerization reactor in a commercial unit is fairly substantial, normally on the order of 200 liters or more. In the present invention, the residence time of the reaction mixture within the prepolymerization reactor 16 is less than a minute and, as practical matter on the order of several seconds, and the volume capacity of the propolymerization reactor will be quite small, normally less than 1 liter. For most applications of the invention, the residence time within the prepolymerization reactor is 10 seconds or less.

The drawing illustrates the preferred order of addition of the catalyst components to the carrier stream. That is, it is desirable that the titanium chloride catalyst be added to the carrier stream which already contains the cocatalyst and the electron donor compound. However, if desired, the electron donor can be added to the carrier stream after the addition of the titanium base catalyst component but still before the addition of the propylene. In a preferred embodiment, the cocatalyst should be present when the electron donor compound and the base catalyst component contact one another because it is believed that this avoids poisoning of the titanium catalyst.

In a specific embodiment of the invention, the titanium tetrachloride base catalyst component is supplied to an elongated tubular prepolymerization reactor of extremely low capacity which is operated at a residence time of 2 seconds or less.

In this embodiment, reaction chamber 16 is defined by a 7 feet long tubing having an internal diameter of $\frac{3}{8}$ inch. The flow rate is adjusted to provide for a residence time within the tubing of 2 seconds or less.

In experimental work carried out relative to the invention, polypropylene was produced with "raw" catalysts (no prepolymerization) catalyst prepolymerized by a batch-type procedure and catalyst prepolymerized in a tubular reactor. In each test the polymerization reaction was carried out in a two liter reactor at a temperature of 70° C. and a polymerization time of 2 hours.

Two catalysts were employed in the experimental work and are identified herein as catalyst A and catalyst B. Both catalysts were commercially-available Ziegler-type catalysts in the form of titanium chloride on a magnesium chloride support. The ratio of titanium tetrachloride to magnesium chloride was slightly lower for catalyst A than for catalyst B. Catalyst A contained 19 wt. % magnesium and catalyst B about 16 wt. % magnesium. In each test, TEAL and DPMS were employed as the cocatalyst and electron donor respectively. The polypropylene was charged to the 2 liter reactor in liquid form in an amount of about 1.4 liters.

In the experiments carried out with catalyst A without prepolymerization, the reactor temperature was initially stabilized at 30° C. and then charged with hydrogen followed by liquid propylene. The reactor temperature was brought to the reaction temperature of 70° C. The titanium chloride catalyst was charged to a 40 cc tubular reaction cylinder in a mineral oil slurry. TEAL and DPMS were mixed together and then added to the cylinder subsequent to the addition of the base catalyst component. After the addition of the TEAL-DPMS mixture, the catalyst system was flushed from the 40 cc cylinder to the 2 liter reactor. The polymerization reaction proceeded for the two-hour period at the reaction temperature of 70° C.

The catalyst A and B employed in the batch prepolymerization test had been initially pretreated under prepolymerization conditions. The pretreatment procedure generally followed addition of the titanium catalyst component to a vessel containing hexane, TEAL and DPMS. After agitation for a time sufficient to insure adequate contact between the catalyst, cocatalyst and electron donor, propylene was added in an amount to provide a weight ratio of propylene to catalyst within the range of 2–4. The pretreated catalyst was separated and washed with hexane or heptane to remove excess TEAL and then stored until used in the batch prepolymerization procedure.

In the batch prepolymerization test runs, TEAL and DPMS were added to a hexane solvent and thoroughly mixed for a period of 5 minutes. The titanium chloride catalyst component was added to the flask and the resulting mixture stirred for an additional 5 minutes. Gaseous propylene from a propylene tank in an amount to provide a weight ratio of propylene to titanium chloride catalyst within the range of 2–4 was passed through the flask for a period of 2 hours. The amount of propylene used in the prepolymerization step was determined by weighing the propylene cylinder before and after the procedure. During the prepolymerization procedure, the flask was maintained at a temperature of about 20°–25° C.

Upon conclusion of the prepolymerization procedure, the prepolymerized catalyst was separated and washed with hexane. The prepolymerized catalyst was stored at 0° F. until used in the polymerization reaction.

The tubular prepolymerization procedure was carried out in the 40 cubic centimeter cylindrical reaction chamber which had an internal diameter of about 2.5 cm. In the tubular prepolymerization tests, the 2 liter reactor was initially charged with one half of the TEAL and DPMS mixture followed by hydrogen and most of the propylene used in the polymerization run, typically about 1.2 liters, was added to the two liter reactor. The remaining one half of the TEAL and DPMS mixture was added to the 40 cc tubular reaction cylinder. The solid titanium chloride base catalyst was then added to the 40 cc reaction cylinder. After a precontact time between the catalyst components of about 3 minutes, the reaction cylinder was filled with polypropylene and, after the desired prepolymerization time, was flushed to the two liter reactor with liquid propylene at room temperature to add an additional 200 milliliters of propylene to the 2 liter reactor. The prepolymerization time within the tubular cylinder ranged from about 2 to 10 seconds, as set forth in the following experimental data.

The reaction parameters and the results obtained in terms of catalyst efficiency isotatic index and melt index and bulk density are set forth below in Tables I and II. In the experimental work reported in Table I for catalyst A, the first two runs were carried out with raw catalyst (no prepolymerization) and the next five runs were carried out under batch prepolymerization procedure. The remaining runs Nos. 8–20 were carried out employing the tubular prepolymerization procedure. The experimental work reported in Table II was carried out with catalyst B. Tests 15–27 involved prepolymerizing the catalyst by batch procedures. The remaining runs 28–33 were carried out using the tubular prepolymerization procedure described above. In Runs 1–7, 11–14 and 28–33, 15.6 millimoles of hydrogen were supplied to the polymerization reactor. In Runs 9–10, 17.8 millimoles of hydrogen were added, and in Runs 15–27, 65 millimeters of hydrogen gas were added.

In Tables I and II the second column indicates the prepolymerization residence time, where applicable, in seconds. The third and fourth columns set forth the amounts in millimoles of TEAL and DPMS used. The yield in grams of polypropylene is set forth in column 5 and the magnesium content in weight parts per million of the polypropylene is given in column 6. The catalyst efficiency in kilograms of polypropylene per gram of catalyst at the conclusion of the two hour polymerization period is set forth in column 7. The polypropylene product is characterized in columns 8–10. The wt.% of heptane insolubles found in the polypropylene is, of course, an indication of the isotatic index of the polymer. The melt flow index, as determined in accordance with ASTM testing spec D-1238-82, is set forth in column 10 and the bulk density of the polypropylene is given in the last column.

TABLE I

| | | | | CATALYST A | | | | | |
|---|---|---|---|---|---|---|---|---|---|
| Run | Prepolym. sec. | TEAL, mmol | DPMS, mmol | Yield, g | Mg, ppm | Eff. kg/g | Hept. Insol, wt % | M.I., g/10 min | Bulk Den. g/cc |
| 1 | none | 2 | 0.4 | 108 | 6.3 | 30 | 97 | 8 | 0.39 |
| 2 | none | 2 | 0.4 | 74 | 6.5 | 29 | 97 | 7 | 0.46 |
| 3 | Batch | 2 | 0.4 | 257 | 5.1 | 37 | 98 | 5 | 0.47 |
| 4 | Batch | 2 | 0.4 | 143 | 7.6 | 25 | 98 | 13 | 0.47 |
| 5 | Batch | 1 | 0.05 | 298 | 4.0 | 48 | 97 | | 0.44 |

TABLE I-continued

CATALYST A

| Run | Prepolym. sec. | TEAL, mmol | DPMS, mmol | Yield, g | Mg, ppm | Eff. kg/g | Hept. Insol, wt % | M.I., g/10 min | Bulk Den. g/cc |
|---|---|---|---|---|---|---|---|---|---|
| 6 | Batch | 1 | 0.05 | 250 | 4.4 | 43 | 96 | 11 | 0.41 |
| 7 | Batch | 1 | 0.05 | 197 | 4.3 | 44 | 97 | 8 | 0.43 |
| 8 | 10 | 2 | 0.4 | 403 | 5.4 | 35 | | | 0.47 |
| 9 | 10 | 2 | 0.4 | 316 | 5.2 | 37 | 99 | 9 | 0.51 |
| 10 | 10 | 2 | 0.4 | 311 | 5.3 | 36 | 99 | 7 | 0.53 |
| 11 | 10 | 2 | 0.2 | 154 | 4.6 | 41 | 97 | 9 | 0.49 |
| 12 | 2-3 | 2 | 0.4 | 145 | 4.5 | 42 | 97 | 7 | 0.44 |
| 13 | 10 | 2 | 0.05 | 400 | 4.3 | 44 | 92 | 15 | |
| 14 | 10 | 2 | 0.04 | 421 | 3.6 | 53 | 99 | 12 | |

TABLE II

CATALYST B

| Run | Prepolym. sec. | TEAL, mmol | DPMS, mmol | Yield, g | Mg, ppm | Eff. kg/g | Hept. Insol, wt % | M.I., g/10 min | Bulk Den. g/cc |
|---|---|---|---|---|---|---|---|---|---|
| 15 | Batch | 2.00 | 0.1 | 234 | 5.6 | 29 | 96.9 | 7 | |
| 16 | Batch | 2.00 | 0.1 | 173 | 6.4 | 25 | 97.5 | 8 | |
| 17 | Batch | 2.00 | 0.1 | 182 | 5.4 | 30 | 97.5 | 6 | |
| 18 | Batch | 2.00 | 0.1 | 189 | 5.8 | 28 | 97.8 | 4 | |
| 19 | Batch | 1.20 | 0.062 | 225 | 5.4 | 30 | | 7 | |
| 20 | Batch | 0.20 | 0.01 | 124 | 11.4 | 14 | 95.4 | 6 | |
| 21 | Batch | 1.0 | 0.1 | 225 | 6.1 | 26 | 97.6 | 5 | |
| 22 | Batch | 0.62 | 0.062 | 158 | 6.0 | 27 | 97.5 | 4 | |
| 23 | Batch | 0.4 | 0.062 | 180 | 7.1 | 22 | 98.1 | 3 | |
| 24 | Batch | 2.0 | 1.67 | 186 | 6.5 | 25 | 97.9 | 5 | |
| 25 | Batch | 0.6 | 0.5 | 173 | 6.6 | 24 | 97.3 | 5 | |
| 26 | Batch | 0.4 | 0.33 | 164 | 8.9 | 18 | 97.8 | 5 | |
| 27 | Batch | 0.2 | 0.17 | 26 | 43.2 | 4 | | | |
| 28 | 5 | 2 | 0.4 | 144 | 6.0 | 27 | 99 | 8 | 0.48 |
| 29 | 5 | 2 | 0.2 | 156 | 6.2 | 26 | 98 | 7 | 0.48 |
| 30 | 5 | 2 | 0.1 | 149 | 6.1 | 26 | 98 | 7 | 0.48 |
| 31 | 5 | 2 | 0.05 | 148 | 6.2 | 26 | 98 | 7 | 0.46 |
| 32 | 5 | 2 | 0.04 | 158 | 6.4 | 25 | 97 | 6 | 0.46 |
| 33 | 5 | 2 | 0.03 | 148 | 7.3 | 22 | | 7 | |

Runs 1-14, which were all carried out with the same titanium chloride catalyst A permit a direct comparison to be made between the polymerization reaction carried out with raw catalyst and with catalyst prepolymerized by a batch type and by the tubular prepolymerization procedure. As would be expected the prepolymerized catalysts in general give substantially higher activity than the raw catalysts. In addition, the tubular type prepolymerization procedure, with its relatively short prepolymerization time, surprisingly performed as well as, and in some cases, even better than the catalyst which was prepolymerized in accordance with the batch type procedure.

The residence time within the prepolymerization reactor is a function of the length of the reactor and the propylene flow rate through the prepolymerization reactor. The amount of solid titanium chloride catalyst component introduced into the carrier stream and also the temperature at which the prepolymerization reactor is operated influences the residence time which can be employed without plugging of the tubular reactor. Specifically an increase in temperature tends to shorten the permissible residence as does an increase in the amount of solid catalyst component added to the carrier stream. Table III gives examples of residence times employed for a configuration of the type described previously in which the tubular reactor has an internal diameter of ⅜". In Table III, the first column sets forth the volume in cubic centimeters of the titanium chloride catalyst during the residence time, the second the length of the reactor, the third the residence time and the fourth, the temperature in °F at which the reactor was operated. In the last column, whether or not persistent plugging occurred under the stated conditions is indicated.

TABLE III

| Cat. Vol. cc | Length feet | Residence Time sec. | T °F. | Plugging |
|---|---|---|---|---|
| 2.5 | 7 | .5 | 60 | |
| 2.5 | 7 | 2 | 60 | |
| 1.3 | 20 | 1.8 | 60 | Yes |
| 1.3 | 7 | .5 | 60 | |
| 1.3 | 7 | .2 | 60 | |
| .7 | 7 | .2 | 60 | |
| 1.3 | 20 | 1 | 72 | |
| 1.3 | 7 | .75 | 80 | |

As noted previously, it is believed that particle size and bulk density of the final polymer product can be affected by the residence time within the prepolymerization reactor. If it is desired to provide for a residence time greater than a few seconds under ambient temperature conditions, the diameter of the tubular reactor may be increased materially over that indicated above. For example, a reactor diameter of several centimeters, as in the case of the experimental data reported previously, may be employed. However, there is a particular advantage in using a relatively small diameter prepolymerization reactor since it minimizes the chances of plugging occurring at the valved entry of the main reactor. For example, the invention can with tubular reactor having an internal diameter of about 1 centimeter or less. Should plugging of the prepolymerized feed result, it likely will occur in this case in the tubular reactor which can be easily removed and cleared.

As the prepolymerized catalyst enters the main reactor, the weight ratio of polymer to the titanium chloride catalyst component may vary from 0.1–100. Preferably, the polymer/titanium chloride wt ratio is within the range of 2–10. The polypropylene pretreatment need not be substantially above that value and the amount of propylene fed to the tubular reactor relative to the amount of catalyst can be relatively small in relation to the amount of propylene used in prior art prepolymerization procedures. More specifically, the weight ratio of propylene to titanium chloride catalyst supplied to the tubular reactor 16 can be 10 or less.

Having described specific embodiments of the present invention, it will be understood that modification thereof may be suggested to those skilled in the art, and it is intended to cover all such modifications as fall within the scope of the appended claims.

We claim:

1. In a process for supply of a pretreated Ziegler-type catalyst to an olefin polymerization reactor, the steps comprising:
    (a) establishing a fluid carrier stream containing said catalyst;
    (b) adding olefin monomer to said carrier stream containing said catalyst;
    (c) flowing said carrier stream containing said olefin monomer and said catalyst through an elongated tubular reactor at a flow rate sufficient to provide a residence time in said tubular reactor of less than one minute under temperature conditions to prepolymerize said catalyst with said monomer within said tubular reactor without plugging of said tubular reactor; and
    (d) passing said carrier stream to the polymerization reactor.

2. The method of claim 1 wherein the residence time in said tubular reactor is no more than 10 seconds.

3. The method of claim 2 wherein said residence time is no more than 2 seconds.

4. The method of claim 1 wherein the volume of said tubular reactor is less than 1 liter.

5. The method of claim 1 wherein said tubular reactor has an internal diameter of no more than 1 centimeter.

6. The process of claim 1 wherein said olefin monomer is propylene.

7. The process of claim 6 wherein the residence time of said carrier stream within said tubular reactor after the addition of propylene monomer is no more than ten seconds.

8. The process of claim 7 wherein said tubular reactor is operated at a temperature no greater than 30° C.

9. The process of claim 6 wherein said Ziegler-type catalyst is used in conjunction with a cocatalyst and an electron donor and wherein said cocatalyst and electron donor are entrained in said carrier stream at the time of the addition of the Ziegler-type catalyst.

10. The process of claim 6 wherein the weight ratio of propylene monomer to said Ziegler-type catalyst supplied to said tubular reactor is no more than 10.

11. In a process for the supply of a pretreated Ziegler-type catalyst to a continuous flow reactor for the polymerization of propylene in the liquid phase, the steps comprising:
    (a) establishing a fluid carrier stream composed of a liquid hydrocarbon solvent containing a cocatalyst for said Ziegler-type catalyst;
    (b) adding said Ziegler-type catalyst to said carrier stream;
    (c) adding liquid propylene to said carrier stream containing said catalyst and cocatalyst;
    (d) after the addition of said propylene, flowing said carrier stream through an elongated tubular reactor at a flow rate sufficient to provide a residence time in said tubular reactor of less than one minute and under temperature conditions to prepolymerize said catalyst by the polymerization of said liquid propylene within said reactor without plugging said tubular reactor; and
    (e) passing said carrier stream containing said prepolymerized catalyst to said continuous reactor.

12. The method claim 11 wherein an electron donor compound is incorporated into said carrier stream prior to the incorporation of said propylene and said cocatalyst is present upon the contact of said Ziegler-type catalyst and said electron donor.

13. The process of claim 11 wherein the weight ratio of said propylene to said Ziegler-type catalyst supplied to said tubular reactor is within the range of 2–10.

14. The method of claim 11 wherein the residence time in said tubular reactor is no more than 10 seconds.

15. The method of claim 14 wherein said residence time is no more than 2 seconds.

16. The method of claim 11 wherein the volume of said tubular reactor is less than 1 liter.

* * * * *